May 22, 1928.  1,670,577

G. JOANNES

THERMOMETER

Filed May 5, 1925  2 Sheets-Sheet 1

Inventor,
Giuseppe Joannes,
By Hemmingworth Jr.
Atty

May 22, 1928.  1,670,577

G. JOANNES

THERMOMETER

Filed May 5, 1925   2 Sheets-Sheet 2

Inventor,
Giuseppe Joannes,
By [signature] atty

Patented May 22, 1928.

1,670,577

UNITED STATES PATENT OFFICE.

GIUSEPPE JOANNES, OF TURIN, ITALY.

THERMOMETER.

Application filed May 5, 1925. Serial No. 28,200.

It is known that in modern combustion engines, more particularly in those used in connection with motor cars, aeroplanes and other motor vehicles, it is of great importance to control the circulation of the water in the cooling system, in order to ascertain at any moment its temperature and whether it is approaching the boiling point.

Apparatus of several types have been proposed for the purpose of effecting this control, which must be realized in a continuous and immediate manner, without any special manipulations.

Apparatus have been proposed (see among others the Boyce patents) consisting essentially in a thermometer arranged on the radiator filling hole, with its bulb immersed in the free space above the level of the water contained in the radiator, of which the thermometer denotes the variations in temperature.

The apparatus is substantially similar in construction to the thermometer described in my U. S. Patent No. 1,460,909, the part affected by temperature being arranged in direct contact with the circulating water and denoting therefore the exact temperature of same.

A further advantage of my invention is that the apparatus being actuated by a certain quantity of air or other gas enclosed in the flexible bags at the pressure of 760 mm., it is provided with automatic altimetric correction.

Thus, by adjusting the apparatus to mark by a given displacement of the pointer the boiling point of the water at 100° C. at the sea level, it will mark the boiling point at 96° at 1000 meters height, at 93° C. at 2000 meters height and so on, by the same displacement of the pointer, the pressure of the air enclosed in the flexible bag correcting the indication of the apparatus, which would tend to mark simply the actual water temperature.

This is particularly useful at considerable altitudes for preventing the water from reaching the boiling point without the driver being aware of it; this would not mean an immediate danger, the temperature not having risen excessively, but it would cause the rapid consumption of the water provision, and consequently the danger of an excessive super-heating, which the apparatus would no longer be capable to detect, as, the water level being lowered in the radiator, the water itself no longer acts upon the part affected by temperature.

The accompanying drawing shows diagrammatically by way of example a constructional form of the apparatus forming the object of this invention.

Figure 1:
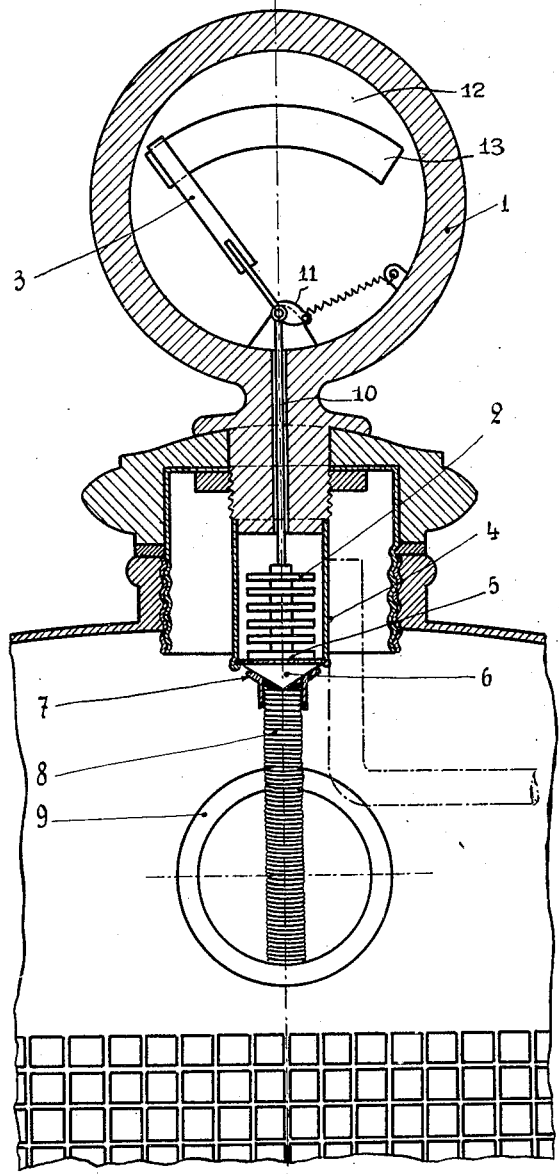
Figure 1 is a front view partly in section.
Figure 2:
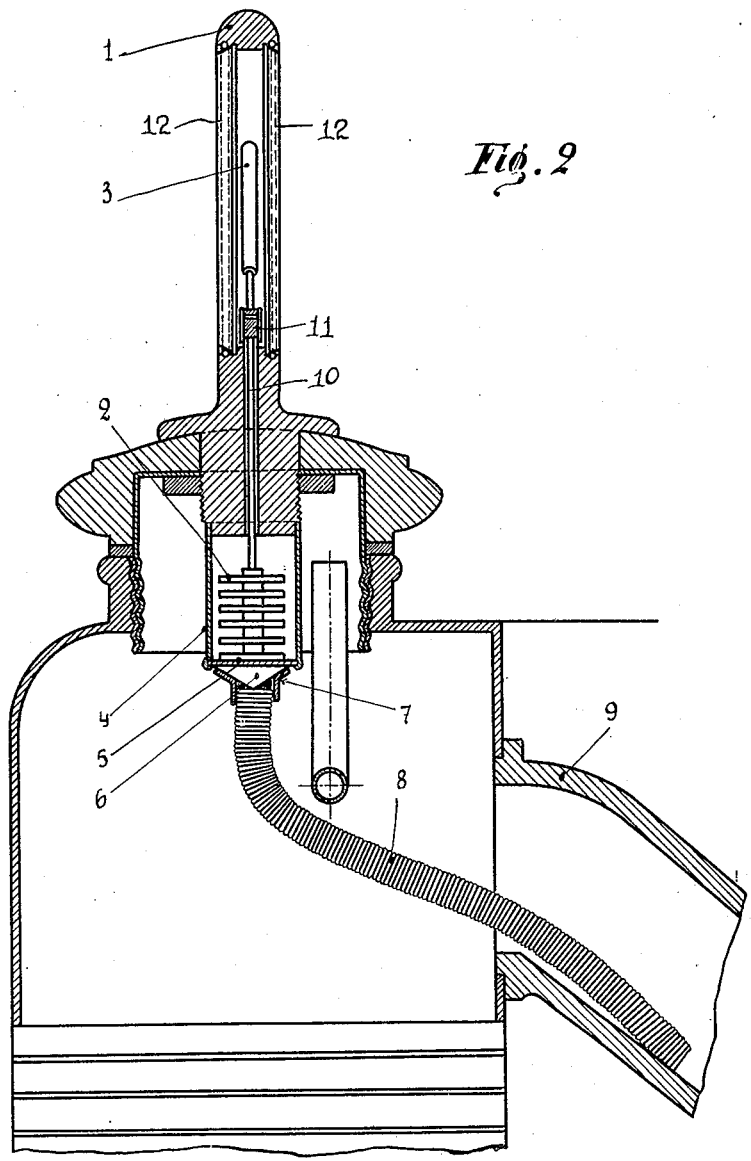
Figure 2 is a vertical section on line A—B of Fig. 1.

1 denotes the temperature indicating apparatus, the flexible bags 2 acting upon the pointer 3 being protected against direct contact with the atmosphere by a casing 4. The lower bag is welded to the bottom 5 of the casing 4 to which is secured a cone 6 connected through a flange 7 to a flexible metallic receptacle 8 filled with a suitable fibrous material (cotton, hemp, asbestos, etc.).

This extension is introduced into the tube 9 conveying the hot water from the engine to the radiator, and dips into the water.

The pressure in the bags 2 will be raised and lowered according to variation of the temperature within the radiator and will produce the raising or the lowering of the bags. This movement is transmitted through a rod 10 to a crank 11 to which is secured the pointer 3, which is oscillated in the frame of the apparatus between two discs 12 which are preferably opaque except in a curved transparent sight portion 13 allowing the pointer to be seen through the glass.

The device works as follows:

The water contained in the tube 9 rises owing to capillarity along the fibrous material contained in the receptacle and comes in contact with the cone 6, through which it transmits its own variations in temperature to the air contained in the flexible bags 2.

The flexible bags expand more or less and move the pointer 3 on the dial.

The apparatus being adjusted at a pressure of 760 mm., as the altitude increases, it will tend to mark an excess of temperature owing to the fact that the action on the flexible bags of the pressure due to heating is added to the fall in atmospheric pressure. This is particularly useful as, in view of the fact that this variation substantially corresponds with the variation of the boiling point of water, the apparatus will constitute a boiling indicator proper, while usual e. g. mercurial thermometers cannot but indicate the temperature. This apparatus is therefore particularly advantageous for mountain drives and for aircraft engines.

The arrangement of the receptacle 8 within the tube 9 has the advantage that, in case the water circulation stops owing to a damage to the pump, freezing in the radiator, etc., this condition is immediately detected by the superheating of the water contained in the tube 9.

It is obvious that the form and constructional details of this apparatus can be varied from those above described by way of example, without departing from the invention.

What I claim is:

The combination with an automobile radiator and a tube for supplying water thereto to be cooled, of a temperature indicating device comprising a radiator plug, an annular dial frame thereon, discs mounted in the frame, a pointer pivoted in the frame between the discs, a receptacle in the plug communicating with the atmosphere, flexible bags on the bottom of the receptacle containing air which at sea level has a pressure of 760 mm. mercury, a cup arranged against the outer face of the receptacle bottom, a hose extending into the water supply tube and connected to the bottom of the cup, a filling of fibrous material in said hose, and means operated by the flexible bags to oscillate the pointer.

In testimony that I claim the foregoing as my invention, I have signed my name.

GIUSEPPE JOANNES.